US006550368B2

(12) United States Patent
Leeman et al.

(10) Patent No.: US 6,550,368 B2
(45) Date of Patent: Apr. 22, 2003

(54) FLUID POWER INTERLOCK SYSTEM

(75) Inventors: Gerard Leeman, Smithtown, NY (US); Frank J. Langro, Port Washington, NY (US)

(73) Assignee: Festo Corporation, Hauppauge, NY (US)

( * ) Notice: Subject to any disclaimer, the term of this patent is extended or adjusted under 35 U.S.C. 154(b) by 19 days.

(21) Appl. No.: 10/039,548

(22) Filed: Oct. 25, 2001

(65) Prior Publication Data

US 2002/0056363 A1 May 16, 2002

Related U.S. Application Data

(60) Provisional application No. 60/244,515, filed on Oct. 31, 2000.

(51) Int. Cl.[7] .......................... F15B 11/00; F16K 35/14

(52) U.S. Cl. ................ 91/513; 137/637.1; 137/596.16; 137/884

(58) Field of Search .................... 91/516, 513; 60/399; 137/637.1, 596.16, 884

(56) References Cited

U.S. PATENT DOCUMENTS 3,856,037 A * 12/1974 Garrett et al. .......... 137/637.1
4,033,379 A * 7/1977 Tooley ................... 137/637.1
6,374,859 B1 * 4/2002 Vu et al. ................... 137/884

* cited by examiner

*Primary Examiner*—Edward K. Look
*Assistant Examiner*—Thomas E. Lazo
(74) *Attorney, Agent, or Firm*—Hoffman & Baron, LLP

(57) ABSTRACT

A fluid power interlock system and method for providing same including a circuit having a first valve shiftable between a first and second state having an input and a pair of selectively operable first outputs. One of the first outputs is operatively connectable to a first actuator and the other of the first outputs is operatively connected to a second valve shiftable between a first and second state. The second valve has a pair of selectively operable outputs, one of the second valve outputs is operatively connectable to a second actuator, and the other of the second valve outputs is operatively connected to the first valve and provides a pilot signal thereto for permitting the first valve to shift from a first state to a second state. Shifting state of either of the first and second valves interrupts the pilot signal thereby preventing the non actuated valve from being actuated and shifting state. The system may also include a manifold, wherein the first and second valves are secured to the manifold.

27 Claims, 9 Drawing Sheets

FLUID POWER INTERLOCK SYSTEM

This application claims priority to U.S. provisional application No. 60/244,515 filed Oct. 31, 2000, the disclosure of which is incorporated herein by reference.

FIELD OF INVENTION

This invention relates to a grouping of fluid power valves to supply fluid power components such as cylinders, valves and the like. More particularly, the present invention relates to a fluid power interlock system including a circuit that will allow only one pneumatic output to be generated by the valve grouping at any one time. The present invention also relates to a fluid power interlock system having valves grouped together on a manifold, thereby eliminating the need for external tubing to perform the interlock function. The present invention further relates to a method of interlocking fluid power signals.

BACKGROUND OF THE INVENTION

Fluid power valves, such as pneumatic valves, are often used to control devices such as linear or rotary actuators. Actuators may be employed to automate machinery and transport materials. In addition, actuators may be used to open and close other valves, such as process control valves, which control a process or manufacturing system. Very often a group of pneumatic actuator control valves are used to control a group of actuators. Due to the nature of the particular process or machinery, it may be desirable to ensure that only one actuator is in the actuated state at any given time. This can be achieved by preventing more than one valve from sending a pneumatic output at any particular time. In order to achieve such control, an interlock circuit is typically employed.

An interlock circuit for a pneumatic circuit may be either electrically or pneumatically controlled. Under either system, when one valve is actuated the other valves in the circuit are prevented from outputting a signal. An electrical interlock typically works by controlling the electrical signals to a valve grouping to prevent more than one solenoid of the valves from being energized at the same time. An electrical interlock can be achieved through electrical circuit components and/or by software if the valves are operated by a programmable logic controller. However, the use of an electrical interlock has a drawback in that the actual pneumatic output from the valve is not totally protected. For example, it is quite common that a solenoid operated pneumatic valve includes a manual override. An electrical interlock solution (circuitry or software) does not prevent manual valve operation; therefore, it remains possible to generate multiple pneumatic outputs and energize more than one actuator at the same time.

In a pneumatic interlock system, the pneumatic outputs from the valves are themselves controlled through pneumatic circuit devices to prevent more than one pneumatic signal from being generated at a given time. Therefore, even if a valve is manually actuated out of sequence, its output will not result in the untimely actuation of an actuator. A common well known pneumatic interlock circuit is shown in FIG. 1, and involves using a normally open valve 6 and a normally closed valve 7 for each actuator 50*a–e*. In addition, two "OR" valves 8 are required for each valve pair to provide the pneumatic interlock control. This prior art pneumatic controlled interlock, however, is often considered impractical due to the number of components required to create the desired interlock function. In some applications, the additional cost and space requirements associated with the interlock function may be prohibitive. In addition, the pneumatic installation can become rather troublesome as a result of the many tubing connections required. For these reasons, a pneumatic interlock circuit is rarely implemented even though there are benefits that can be gained from its use.

Accordingly, it would be desirable to provide a pneumatic interlock system that is easy to assemble and uses a minimum number of components. It would also be desirable to provide a pneumatic interlock system having valve manifold, which interconnects the valves to provide an interlock function.

SUMMARY OF THE INVENTION

It is an advantage of the present invention to provide a fluid power interlock system.

It is a further advantage of the present invention to provide a fluid power interlock system having a pneumatic interlock circuit.

It is still a further advantage of the present invention to provide a fluid power interlock system including a valve manifold that provides the inter-valve connections to achieve a pneumatic interlock circuit.

It is yet a further advantage of the present invention to provide a fluid power interlock circuit including a first valve shiftable between a first and second state having an input connected to a pressure supply. The first valve further includes a first and second selectively operable outputs, and the second output is operatively connectable to a first actuator. The first output is operatively connected to the input of a second valve which is shiftable between a first and second state. The second valve has a third and fourth selectively operable outputs with the fourth output being operatively connectable to a second actuator. The third output is operatively connected to the first valve and provides a fluid power pilot signal thereto for permitting first valve 13*a* to shift from a first state to a second state. Based upon the arrangement of the first and second valves, shifting the state of either of the first and second valves interrupts the pilot signal thereby preventing the non-actuated valve from being actuated and shifting state. Accordingly, only one of the actuators can be energized at a given time.

In accordance with these and other advantages, the present invention provides a fluid power interlock system having a first and second double solenoid externally piloted valve. Each of the valves has a plurality of ports including a pressure port, a first and second pressure outlet port, and a first and second pilot port. The first and second valve each have a first state wherein pressure is supplied to the first outlet port, and a second state wherein pressure is supplied to the second outlet port. Wherein pressure at the first pilot ports assists the first and second valves to be shifted into the first state, and pressure at the second pilot ports assists the first and second valves to be shifted into the second state. The pressure port of the first valve is operatively connectable to a pressure source, and the first outlet port of the first valve is operatively connected to the pressure port of the second valve. The second outlet port of the first valve is operatively connected to a first actuator, and the first valve first pilot port is operatively connectable to the pressure source. The first outlet of the second valve is operatively connected to the second pilot port of the first and second valve, and the second valve second outlet port is operatively connectable to a second actuator. Whereby when either of the first and second valves is shifted to the second state to activate the corresponding actuator, pressure to the second pilot ports of each of the first and second valves is interrupted thereby preventing the other of the first and second valves from being shifted to the second state.

The present invention further provides fluid power actuator interlock manifold including a manifold body having first and second valve stations each including a plurality of ports to correspond with the ports of a sub-base mountable valve. The manifold body includes a channel connecting an air source port to first pilot ports of each of the first and second valve station ports. A second channel connects each of the second pilot ports of each of the first and second valve station ports, and the second channel is in communication with a first outlet port of the second valve station. A third channel connects the air source port to the pressure input port of the first valve station. A fourth channel connects a second outlet port of the first valve station to a first actuator port. A fifth channel connects a second outlet port of the second valve station to a second actuator port. A sixth channel connecting a first outlet port of the first valve station to a pressure input port of the second valve station.

The present invention also provides a method of interlocking fluid power signals comprising the steps of providing a first valve shiftable between a first and second state having a pressure input and a first and second selectively operable output, the first output being operatively connectable to a first actuator;

providing a second valve shiftable between a first and second state and having a pressure input and a first and second selectively operable output, the first output of the second valve being operatively connectable to a second actuator;

operatively connecting the second output of the first valve to the pressure input of the second valve;

operatively connecting the second output of the second valve to a first pilot signal port of the first and second valves for permitting the first valve to shift from the first state to the second state, wherein shifting from the first state to the second state of either of the first and second valves interrupts a flow of pressure from the second output of the second valve thereby preventing the non-shifted valve from being actuated and supplying pressure to a corresponding actuator.

A preferred form of the present invention, as well as other embodiments, features and advantages of this invention, will be apparent from the following detailed description of illustrative embodiments thereof, which is to be read in connection with the accompanying drawings.

DETAILED DESCRIPTION OF THE PREFERRED EMBODIMENTS

The present invention relates to a fluid power interlock system and method for interlocking fluid power signal that includes a fluid power circuit including a plurality of valves arranged to provide a fluid power interlock. These valves may be used to actuate fluid power actuators used on machinery or in process control applications. The actuators may include linear or rotary drives or any other fluid power component including other valves or circuit elements. The interlock circuit prevents more than one fluid power signal from being generated and corresponding actuator to be energized even if multiple valves are inadvertently or accidentally electrically or manually activated. The interlock circuit of the present invention is achieved through the use of a minimal number of components. The interlock system also includes a valve manifold that permits the plurality of valves to be quickly and easily assembled and contains the necessary connections for performing the interlock feature. Ease of maintenance and accessibility to the valves is greatly enhanced by use of the manifold.

Figure 2A:
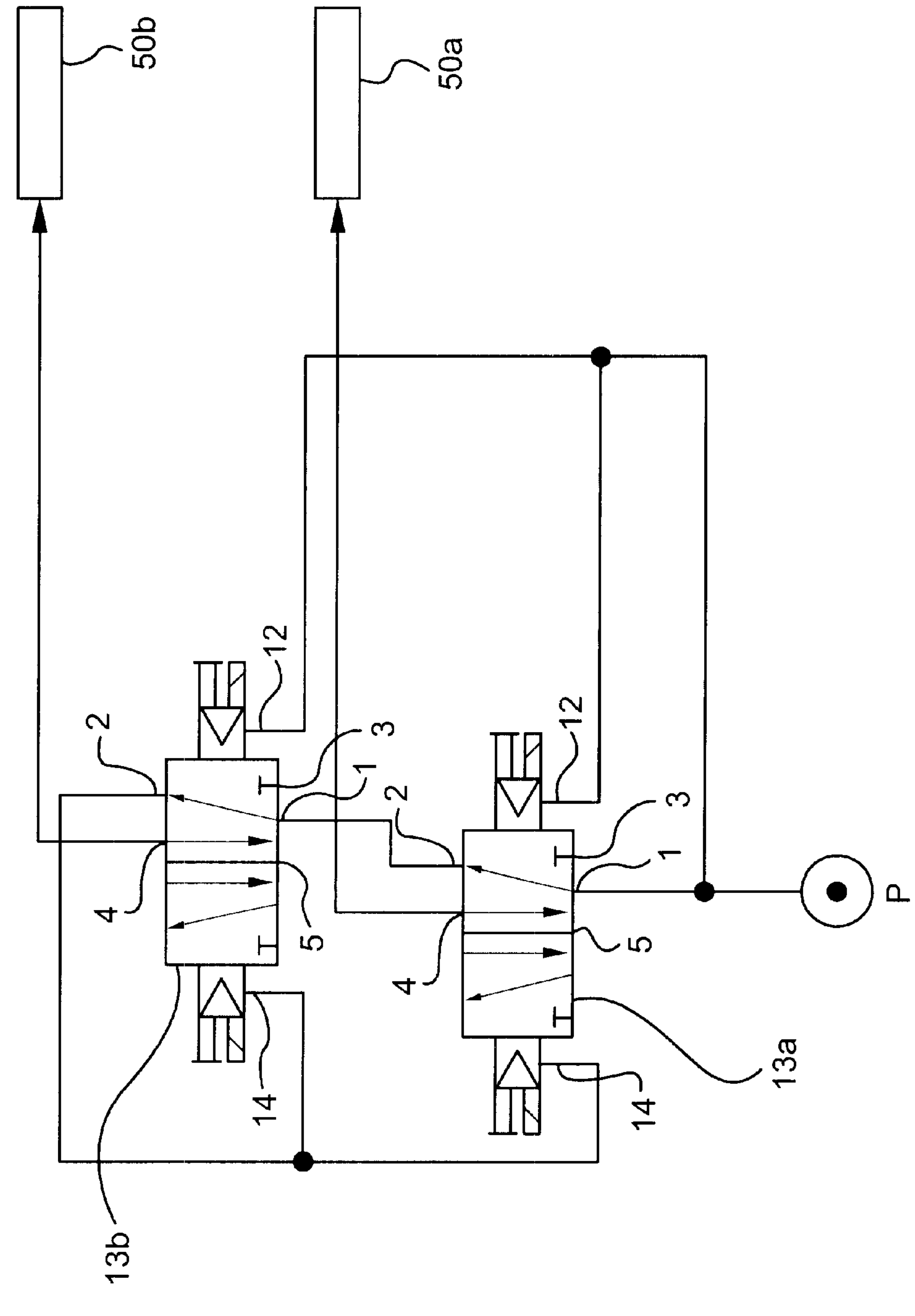
FIG. 2A is a circuit diagram of a fluid power interlock circuit of the present invention showing a first and second valve.

Referring to FIG. 2A, the fluid power interlock circuit in a basic two valve embodiment includes a first valve 13*a* shiftable between a first and second state having an input (1) connected to a pressure supply P. (The port designations used herein conform to industry standards with (1) being the working pressure input, (2) and (4) being the working or output ports, (3) and (5) designating exhaust ports and (12) and (14) designating pilot ports.) The first valve 13*a* further includes a pair of selectively operable first outputs (2) and (4) and one of the first outputs (4) is operatively connectable to a first actuator 50*a*. The other of the first outputs (2) is operatively connected to the input (1) of a second valve 13*b* shiftable between a first and second state. The second valve has a pair of selectively operable second outputs (2) and (4) with one of the second outputs (4) being operatively connectable to a second actuator 50*b*. The other of the second outputs (2) is operatively connected to first valve 13*a* and provides a pneumatic pilot signal thereto for permitting first valve 13*a* to shift from a first state to a second state. Based upon the arrangement of the first and second valves, shifting the state of either of the first and second valves interrupts the pneumatic pilot signal thereby preventing the non-actuated valve from being actuated and shifting state. Accordingly, only one of the actuators can be energized at a given time.

Figure 2B:
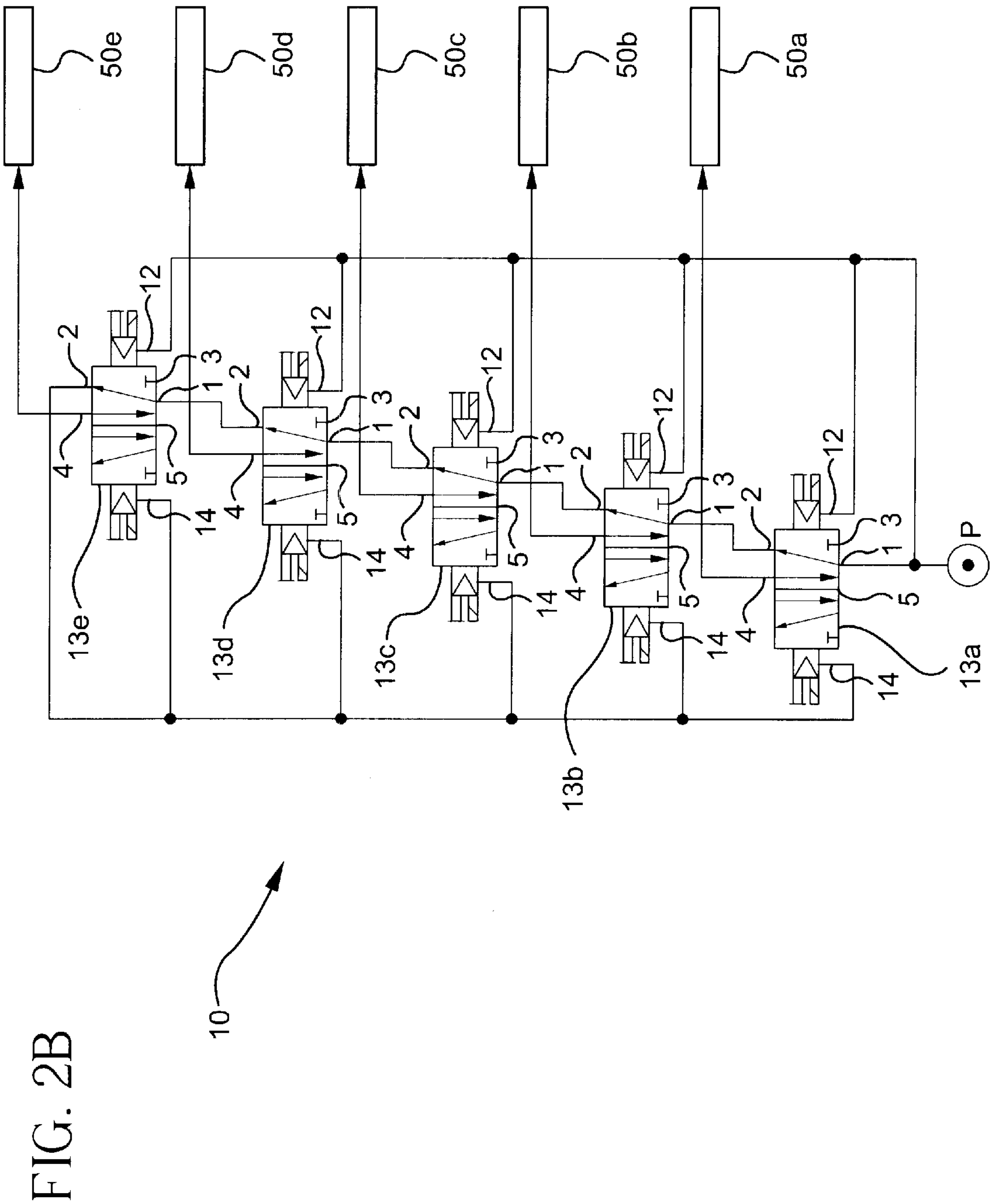
FIG. 2B is a circuit diagram of a fluid power interlock circuit of the present invention showing several valves.
Figure 3:
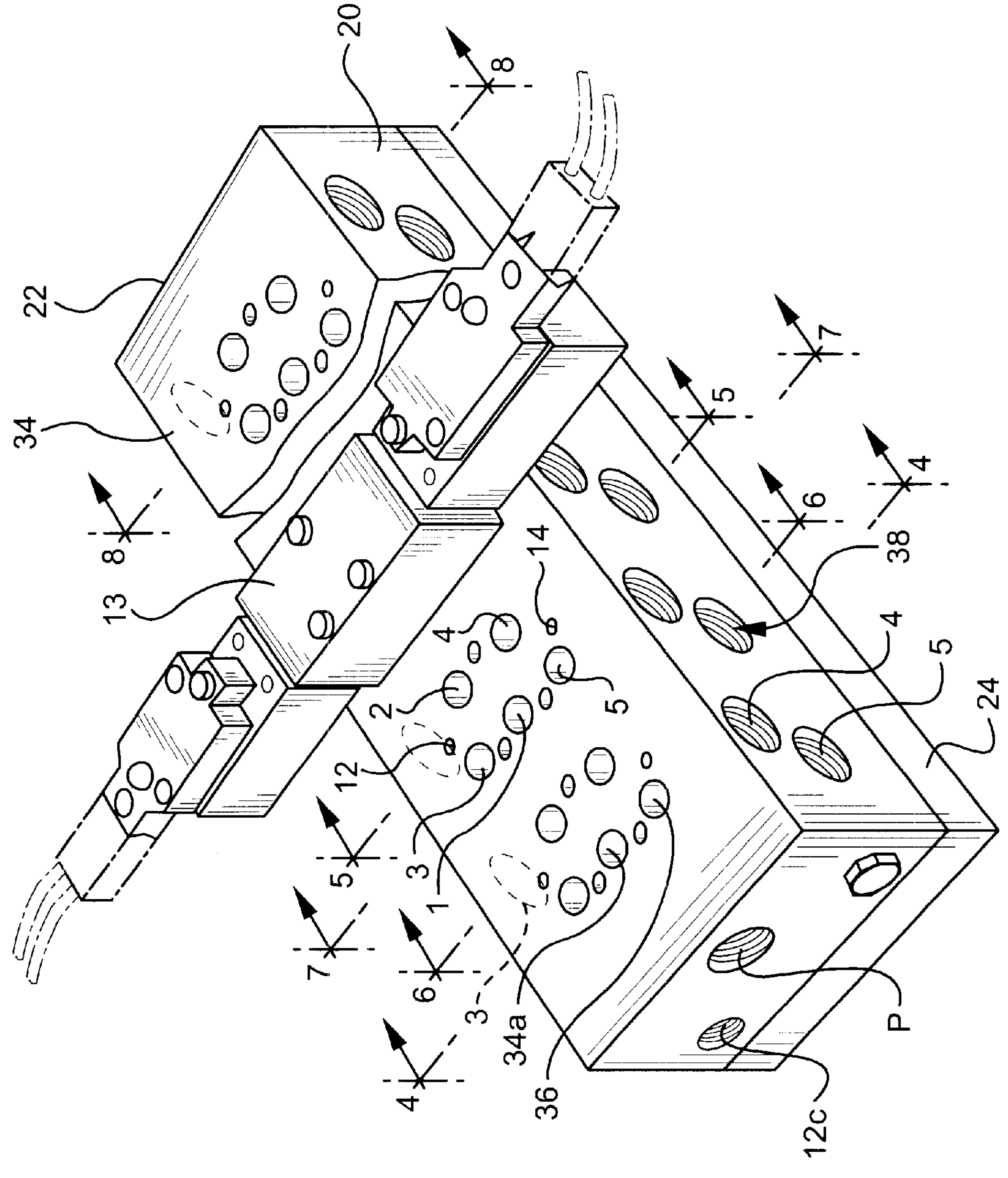
FIG. 3 is a top perspective view of the fluid power interlock system including the valve manifold of the present invention.
Figure 5:
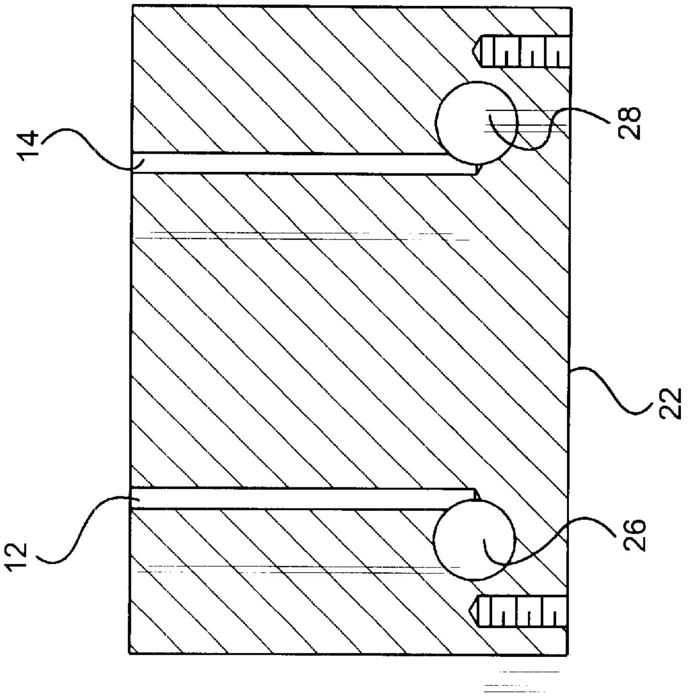
FIG. 5 is a cross-sectional view of the manifold first layer taken along line 5—5 of FIG. 3.
Figure 4:
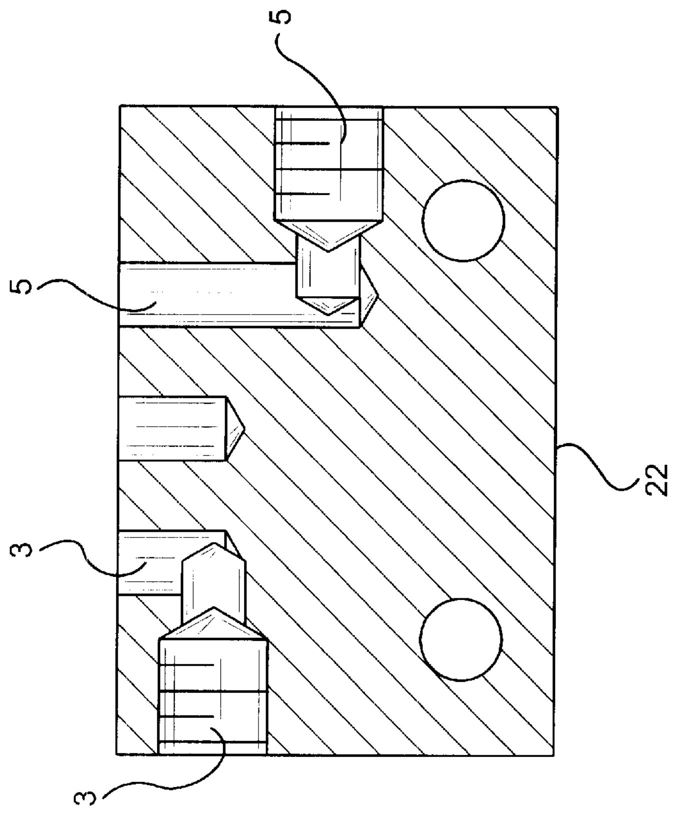
FIG. 4 is a cross-sectional view of the manifold first layer taken along line 4—4 of FIG. 3.

Referring to FIG. 2B, the fluid power interlock system of the preferred embodiment of the present invention includes a pneumatic circuit 10 which employs a plurality of externally piloted 5/2 double solenoid valves 13*a–e*. Such valves are well known in the art and include a pair of electrically operated solenoid actuators and a pair of pneumatic pilot ports. In these types of valves, an electric signal energizes a coil causing a plunger, or armature, to move thereby opening an internal orifice, which in turn allows pressure present at the pilot port, (12) or (14) to flow and drive a valve member to shift the state of the valve. Valves 13*a–e* may further include a manual override. The manual override permits the plunger to be moved manually through either the pushing of a button or rotation of a member, depending on the particular design, both of which result in mechanical engagement that moves the plunger, thereby shifting the valve. Accordingly, a pneumatic signal need be present at the pilot port in order for the valve to shift its state either electronically, through the energizing of the solenoid, or manually, through the actuation of the manual override. Valves 13*a–e* of the preferred embodiment each also include a pressure port (1), a first and second outlet port (2) and (4) and a first and second exhaust port (3) and (5).

In interlock circuit 10, a pressure source P is operatively connected to the pressure input (1) of first valve 13*a*. Pressure source P is also operatively connected to the pilot ports (12) of each of the valves. The outlet port (2) of all the valves 13*a–e* are connected to the pressure input port (1) of the next valve in the grouping, with the exception of the last valve 13*e*. The outlet port (2) of the last valve 13*e* is operatively connected to the pilot port (14) of each of the valves 13*a–e*. The outlet port (4) of each valve is then connected to the particular actuator 50*a–e* that the valve controls. The actuator may include a process control valve or a pneumatically driven linear or rotary actuator, or any of a number of fluid controlled devices.

In the initial state of the circuit no actuator is supplied with air, pressure is supplied to all the (12) pilot ports of each valve; therefore, the air will flow from the pressure input port (1) to the outlet (2). Pressure is also supplied to the pressure supply port (1) of the first valve which in turn feeds air through each adjacent valve and the last valve 13*e* supplies pressure to all the (14) pilot ports of each valve. Therefore, each valve 13*a–e* is operatively connected to the pressure source. At this point, any valve can be signaled electrically or manually to shift so that pressure is supplied to the outlet port (4) thereby energizing an actuator. When one valve, e.g. 13*a*, is so signaled, the valve shifts and pressure is transferred from outlet (2) to outlet (4), thereby powering actuator 50*a*, but also interrupting the pressure to all the (14) pilot ports. Accordingly, none of the other pneumatic valves in the circuit 10 can be shifted either electrically or by a manual override to the state in which the corresponding actuator is powered. Therefore, the other valves and their corresponding actuators are essentially locked out.

The shifted valve 13*a* can be returned to its initial state by applying an electric control signal to the (12) port since all the valves' ports (12) are supplied by constant pressure source P. Once the energized valve is returned to its initial state, the pilot pressure supply to all (14) ports becomes re-established, and any valve can then be shifted. This interlock feature will be achieved when any of the valves 13*a–e* in the circuit 10 are actuated. While five valves are shown in FIG. 2B, it can be understood that any number of valves could be employed in the circuit.

Figure 1:
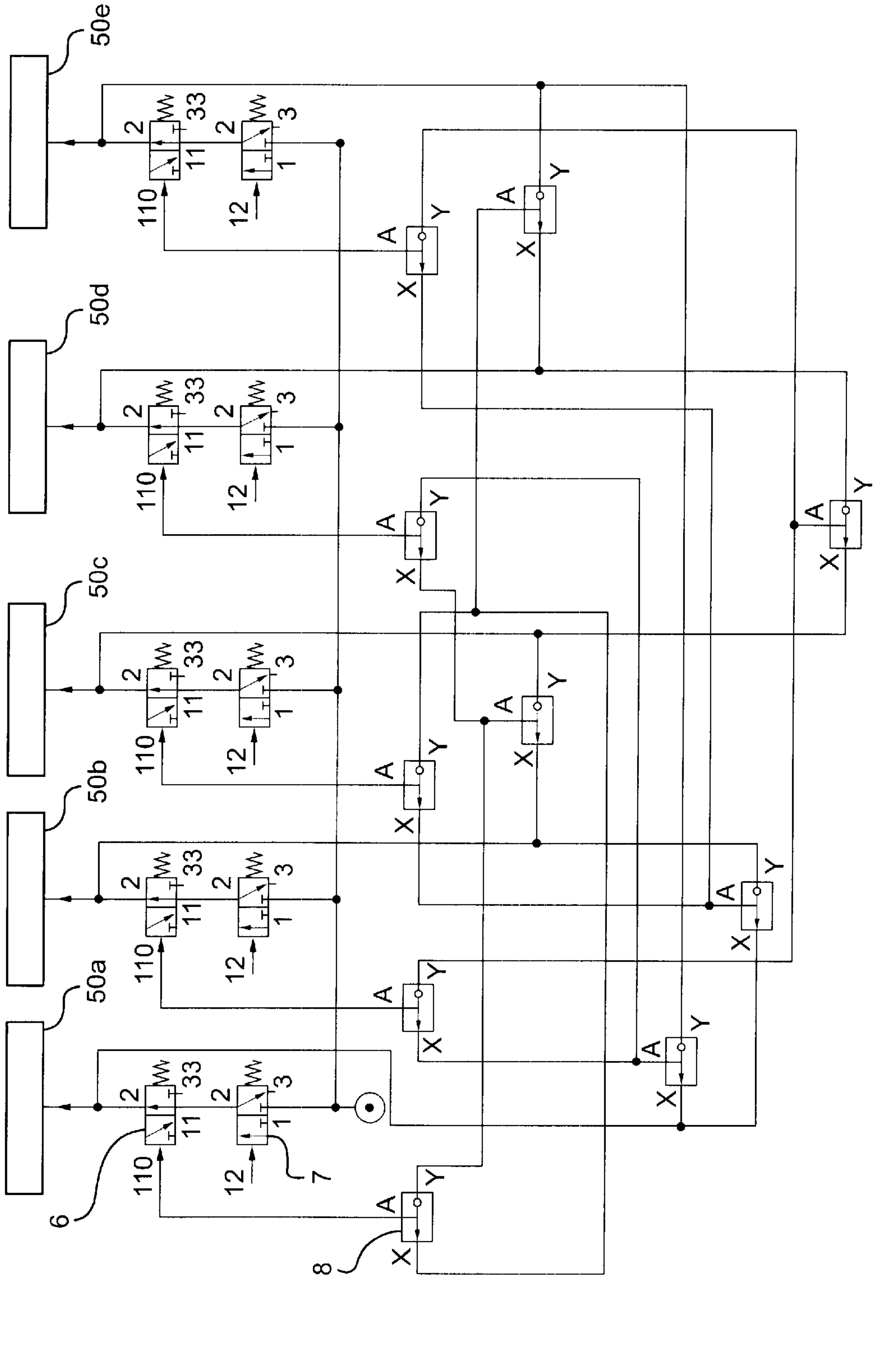
FIG. 1 PRIOR ART
FIG. 1 is a circuit diagram of a prior art fluid power interlock circuit.

The pneumatic interlock circuit 10, permits only one valve of the grouping to be shifted to direct flow to an actuator. The circuit 10 does not rely on controlling electrical signals; therefore, even with valves having manual overrides, only one actuator can be energized at a time. Also, unlike the prior art circuits of the type shown in FIG. 1, the only components needed to achieve the interlock function are the valves used to drive the actuators themselves. This reduces the complexity of the circuit making the design less expensive to assemble and maintain than interlock circuits of the prior art such as that shown in FIG. 1.

The pneumatic interlock circuit 10 of the present invention may be assembled using pneumatic valves that are operatively connected together by conventional fittings and tubing. The individual valves may include threaded ports to receive a fitting, or may be subbase mountable with some or all of the port connections being made on the subbase. However, as the number of signals that must be interlocked increases, so does the amount of connections that must be made. Accordingly, using tubing and connections is labor intensive to produce and creates difficulties in maintenance such as when a particular valve has to be replaced.

In order to compactly package the components forming the interlock circuit 10 and reduce the need for external tubing connections, the fluid power interlock system of the present invention may include a manifold 20 that includes all the fluid power inter-valve connections. Manifold 20, as shown in FIGS. 3–10, includes passages formed therein which channel the fluid between the valves and ports to achieve the interlock feature. Manifold 20 may be formed to hold almost any number of valves by simply modifying the length of the manifold to accommodate the desired number of valve stations. While manifold 20 provides certain benefits, it will be understood by those skilled in the art that the use of a manifold is not necessary to achieve the beneficial effects of the fluid power interlock circuit described above.

Referring to FIGS. 3–10, manifold 20 preferably includes a body having a first 22 and second 24 layer, which are sealing connected along the length of manifold 20. The use of multiple layers facilitates the fabrication of the various internal fluid channels and passageways to be formed in the manifold. The first and second manifold layers 22 and 24 may be formed of metallic material, e.g. aluminum, or a polymer material and the layers may be secured together by mechanical fasteners or by adhesives in a manner well known in the manifold producing art. In the embodiment shown in FIG. 3, second layer 24 may be secured to first layer 22 by threaded fasteners (not shown) extending through holes 32 (FIG. 9) and into threaded receiving holes (not shown) formed in the bottom of first layer 22.

Valves 13*a–e* are removably attachable to manifold 20 and are preferably sub-base mountable valves having all the connection ports (1, 2, 3, 4, 5, 12, 14) on the valve mounting face. Each valve 13*a–e* is preferably secured to the top of first manifold layer 22 by threaded fasteners in a manner well known in the art. First manifold layer 22 may have a number of valve mounting stations 34 including a series of openings 36 corresponding to the connection ports (1, 2, 3, 4, 5, 12, 14) found on the upper mounting face of valve 13. An elastomeric seal (not shown) of a type well known in the art may be positioned between each valve 13 and manifold 20 to prevent air leakage there between. Manifold first layer 22 may further include outlet connections 38 formed on the manifold sides for the exhaust ports (3) and (5) and the working port (4) for each valve. The working port (4) may be fluidly connected through standard fittings and tubing to actuator that the particular valve 13 controls. Also located on manifold first layer 22 are the common main pressure port P, and the common pilot port (12C) through which valve pilot ports (12) are pressurized.

The fluid connections as found within manifold 20 result in the valves being connected in a circuit as shown in FIGS. 2A and 2B. A common pressure port P supplies pressurized air to the input port (1) of the first valve station 34*a*. Channels then connect the output port (2) of the valves to the input port (1) of the next valve in the grouping. The last valve has its output port (2) connected to each of the (14) pilot ports of the valves. The second output ports of the valves (4) are connected to the corresponding actuators through ports (4) located on the side of manifold 20. Exhaust ports (3) and (5) are also located on the sides of manifold 20.

Figure 7:
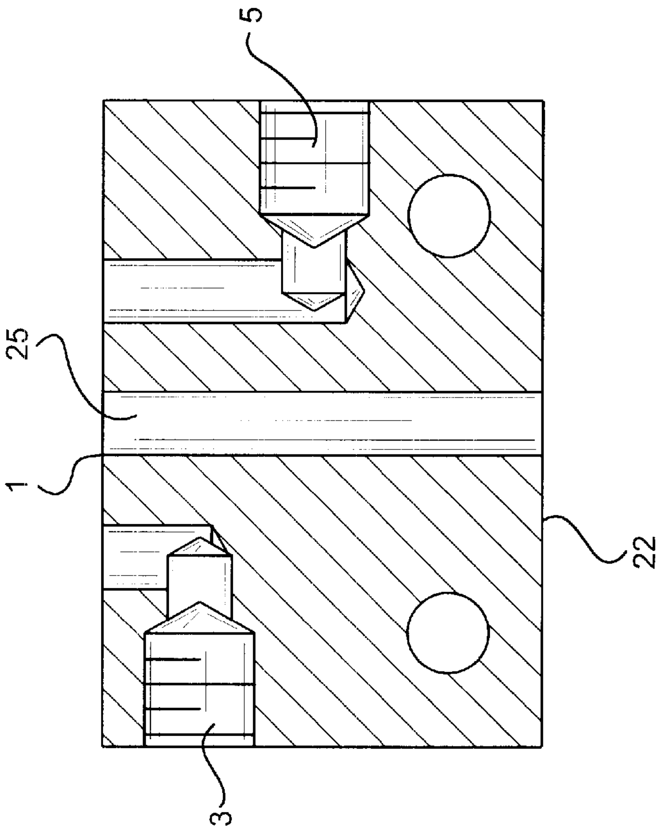
FIG. 7 is a cross-sectional view of the manifold first layer taken along line 7—7 of FIG. 3.
Figure 6:
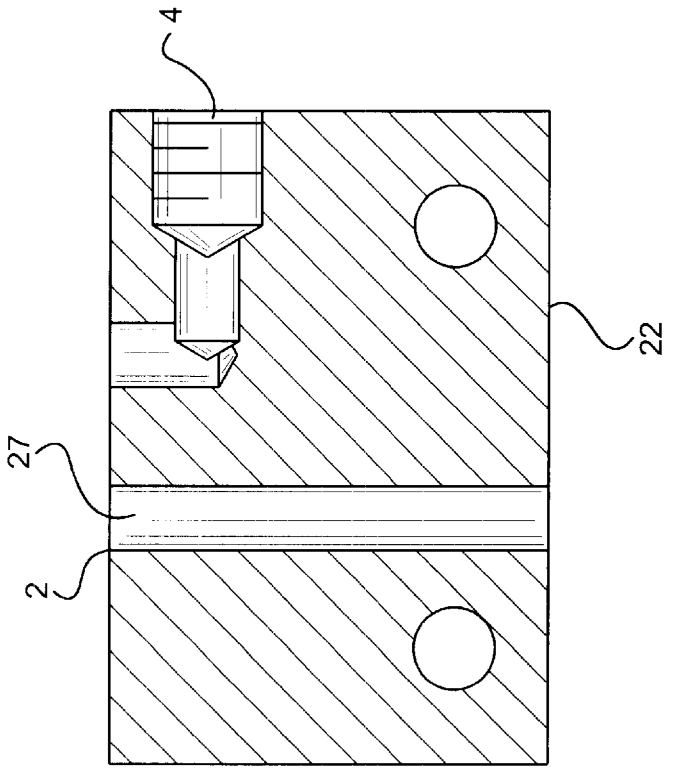
FIG. 6 is a cross-sectional view of the manifold first layer taken along line 6—6 of FIG. 3.
Figure 8:
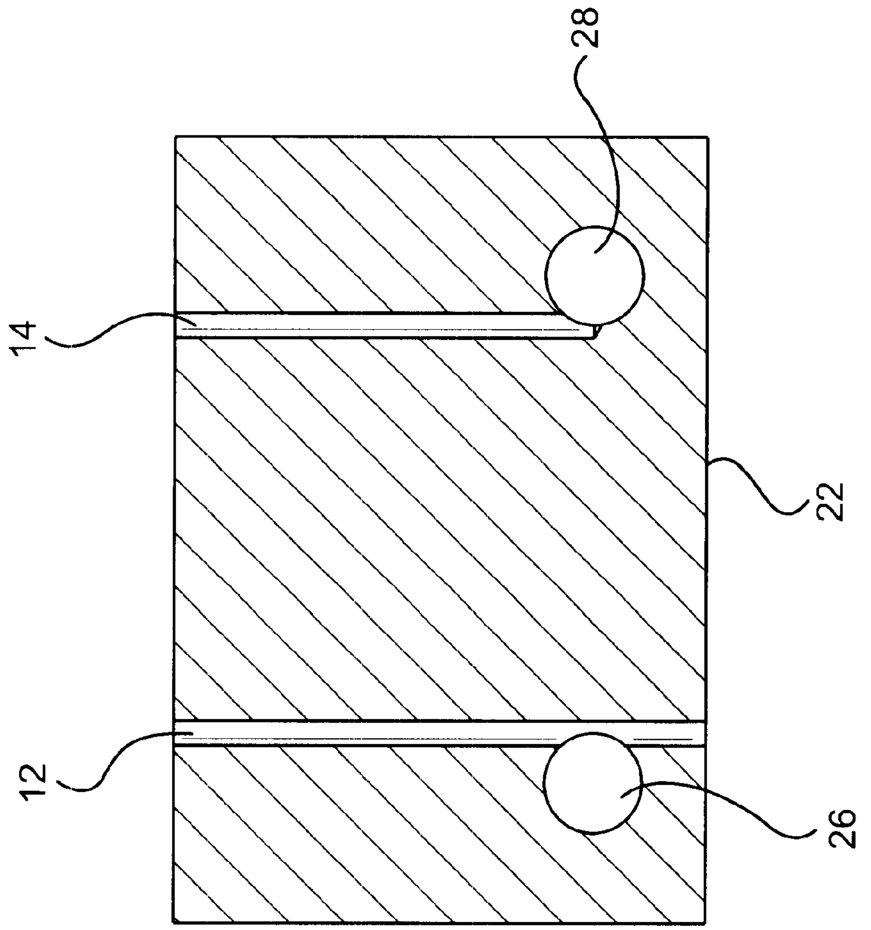
FIG. 8 is a cross-sectional view of the manifold first layer taken along line 8—8 of FIG. 3.

The internal connections are achieved by a series of internal channels created in the layers of the manifold. At the first valve mounting station 34*a* on manifold 20, the pressure input port (1) is fluidly connected to an external common port P (FIG. 3) which may be connected to a pressure supply. Common pressure port P supplies the working pressure to all valves 13 in the grouping. On all the remaining valve mounting stations, port (1) is connected to a pressure supply path 25 formed substantially vertically straight through first manifold layer 22 as shown in FIG. 7. All the port (2) connections 27 to each valve are also formed substantially vertically straight through first manifold layer 22 as shown in FIG. 6. At the last valve station the (12) connection is formed straight through the first manifold layer as shown in FIG. 8. First manifold layer 22 also includes a first longitudinally extending passage 26, which connects all the (12) connections of each valve and a second longitudinally extending passage 28 which connects all the (14) connections of each valve. First passage 26 is supplied with pressure via an external supply through a port on the end of manifold 20, while second passage 28 is closed at its ends and is supplied with pressure internally from the (2) port of the last valve in the grouping.

Figure 9:
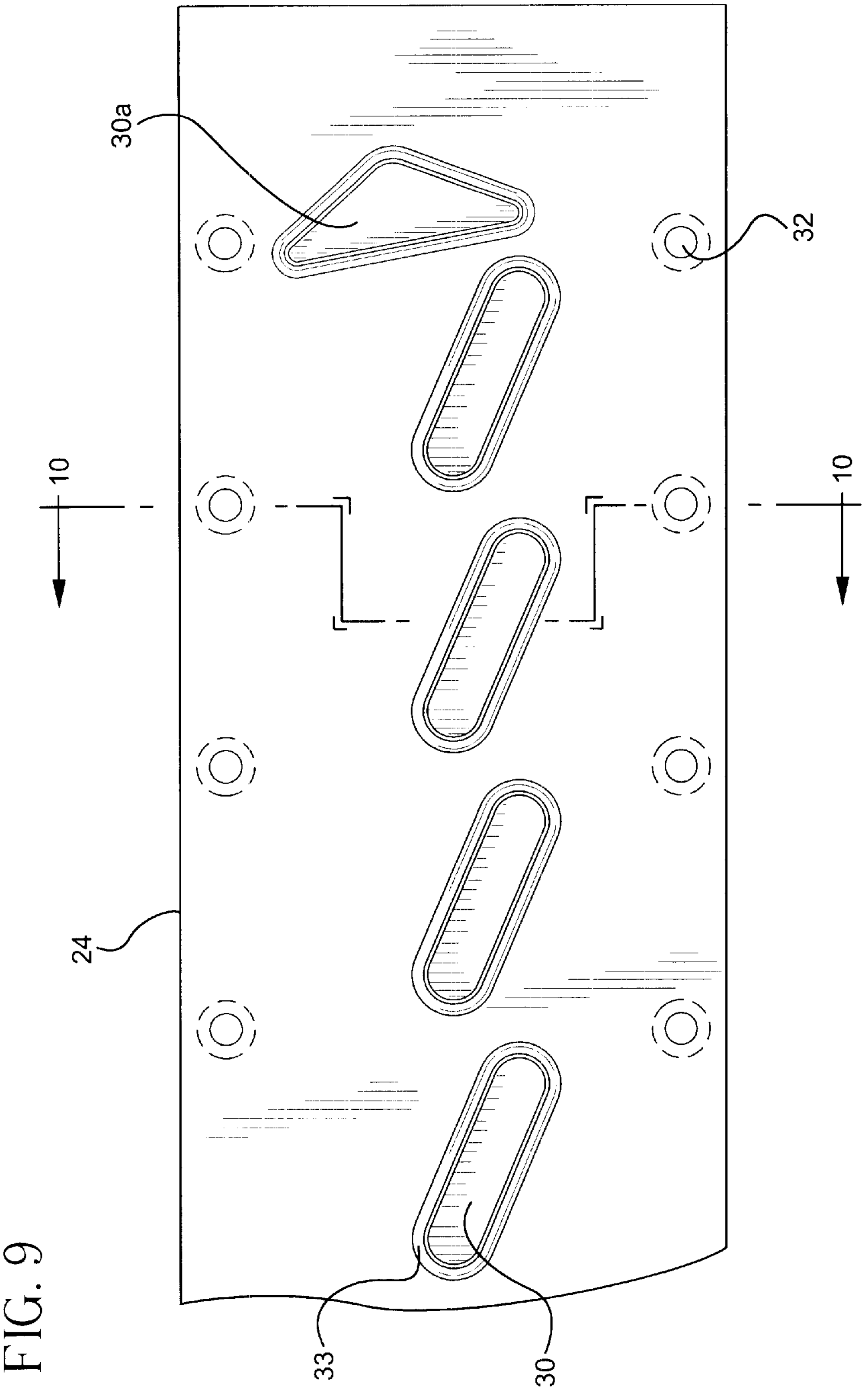
FIG. 9 is a top plan view of the second layer of the manifold of the present invention.
Figure 10:
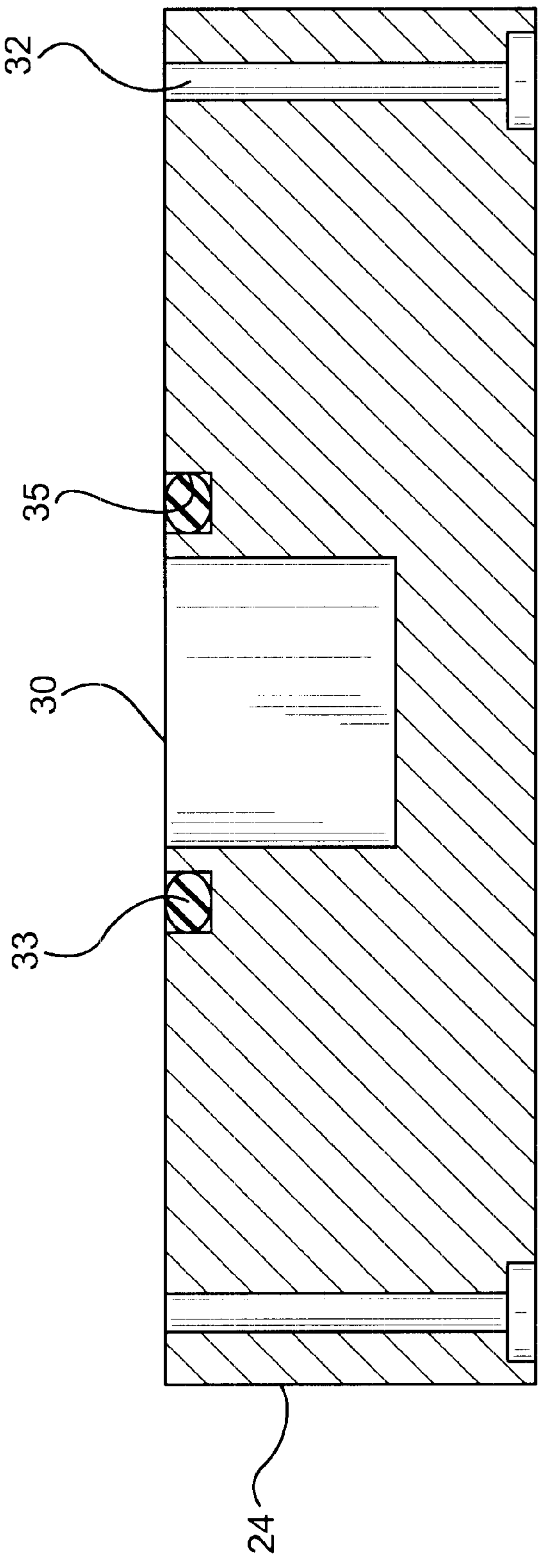
FIG. 10 is a cross-sectional view of the manifold second layer taken along line 10—10 of FIG. 9.

Referring particularly to FIGS. 9–10, second manifold layer 24 has milled channels 30 that connect the outlet port (2) to the inlet port (1) from one valve station to the next. Except at the last valve station, where channel 30*a* connects the outlet port (2) of the last valve to the pilot supply (14). The connecting channels 30 and 30*a* have a groove 35 milled around them to contain an o-ring 33 to prevent air leakage from between the two manifold layers. Accordingly, when the first and second manifold layers 22 and 24 are secured together, the appropriate passageways exist to carry out the interlock circuit 10 of the present invention. The manifold 20 in combination with the valves creates a neat compact system that is easy to assemble and maintain.

It is within the contemplation of the present invention, that the particular routing of channels through manifold 20 can be varied and still achieve the circuit connections between valves required to achieve the interlock function. For example, some of the inter-valve connections could be achieved through the use of a manifold while other connections would be through tubing or other fluid connecting devices in order to provide the pneumatic interlock function.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

We claim:

1. A fluid power interlock circuit comprising:

a first valve shiftable between a first and second state having an input and a first and second selectively operable outputs, said second output being operatively connectable to a first actuator, said first output being operatively connected to a second valve shiftable between a first and second state, said second valve having a third and fourth selectively operable outputs, said fourth output being operatively connectable to a second actuator, said third output being operatively connected to said first valve and providing a fluid power pilot signal thereto for permitting said first valve to shift from a first state to a second state, and wherein shifting state of either of said first and second valves interrupts said pilot signal thereby preventing said non actuated valve from being actuated and shifting state.

2. The fluid power circuit as defined in claim 1, wherein said first and second valves are 5/2 way valves.

3. The fluid power circuit as defined in claim 2, wherein said first and second valves are double solenoid externally piloted valves.

4. The fluid power circuit as defined in claim 1, wherein said first output of said first valve is operatively connected to an input of said second valve.

5. The fluid power circuit as defined in claim 1, wherein said first and second valves each include a first pilot port adapted to receive a fluid power signal to shift said first and second valves into a first state, and said first pilot ports being operatively connectable to a constant pressure source.

6. The fluid power circuit as defined in claim 5, wherein said first and second valves each include a second pilot port adapted to shift said first and second valves into a second state, said third output of said second valve being operatively connected to said second pilot port of said first valve.

7. The fluid power circuit as defined in claim 6, wherein said second pilot port of said second valve being operatively connected to said second pilot port of said first valve.

8. The fluid power circuit as defined in claim 1, further including a third valve operatively connected to said first and said second valves.

9. The fluid power circuit as defined in claim 8, wherein said third valve includes an input port and a pair of output ports, and said input port is operatively connected to said second output of said first valve, and one of said third valve output ports is operatively connected to an input of said second valve.

10. A fluid power interlock circuit comprising:

a first valve shiftable between a first and second state having a first input and a first and second selectively operable outputs, said second output being operatively connectable to a first actuator, said first output being operatively connected to a second input of a second valve shiftable between a first and second state, said first output being in fluid communication with said first input when said first valve is in said first state, and said second output being in fluid communication with said first input when said first valve is in said second state, said second valve having a third and fourth selectively operable outputs, said fourth output being operatively connectable to a second actuator, said third output being operatively connected to said first valve and providing a pilot signal thereto for permitting said first valve to shift from said second state to said first state, said third output being in fluid communication with said second input when said second valve is in said first state, and said fourth output being in fluid communication with said second input when said second valve is in said second state, and wherein shifting from said first state to said second state of either of said first and second valves interrupts said pilot signal thereby preventing said non shifted valve from being actuated and shifting state.

11. The pneumatic interlock circuit as defined in claim 10, wherein said first and second valves are double solenoid externally piloted valves.

12. A fluid power interlock system comprising:

a first valve shiftable between a first and second state having an input and first and second selectively operable outputs, said second output being operatively connectable to a first actuator, said first output being operatively connected to a second valve shiftable between a first and second state, said second valve having third and fourth selectively operable outputs, said fourth output being operatively connectable to a second actuator, said third output being operatively connected to said first valve and providing a fluid power pilot signal thereto for permitting said first valve to shift from a first state to a second state, and wherein shifting state of either of said first and second valves interrupts said pilot signal thereby preventing said non actuated valve from being actuated and shifting state; and a manifold adapted to support and operatively connect said first valve to said second valve.

13. The fluid power interlock system as defined in claim 12, wherein said manifold includes means for connecting said first valve to said second valve to prevent said non actuated valve from being actuated and shifting state.

14. The fluid power interlock system as defined in claim 13, wherein the manifold includes a plurality of internal passageways to provide the connections between the first and second valves.

15. The fluid power interlock system as defined in claim 13, wherein the manifold includes a first and second layer.

16. The fluid power interlock system as defined in claim 13, wherein said first and second valves are double solenoid externally piloted.

17. A fluid power interlock manifold comprising:

a valve body having at least first and second valve stations each including a plurality of ports to correspond with ports of a sub-base mountable valve, said valve body including a first channel connecting an air source port to first pilot ports of each of the first and second valve station ports, a second channel connecting second pilot ports of each of the first and second valve station ports, and the second channel being in communication with a first outlet port of the second valve station, a third channel connecting the air source port to the pressure input port of the first valve station, a fourth channel connecting a second outlet port of the first valve station to a first actuator port, a fifth channel connecting a second outlet port of the second valve station to a second actuator port, a sixth channel connecting a first pressure outlet port of the first valve station to a pressure input port of the second valve station.

18. The manifold as defined in claim 17, wherein said manifold body includes a first layer and a second layer.

19. The manifold as defined in claim 18, wherein said first layer includes said first and second channels.

20. The manifold as defined in claim 19, wherein said first layer includes said third, fourth, fifth channels.

21. The manifold as defined in claim 18, wherein said second layer includes said sixth channel.

22. The fluid power interlock manifold as defined in claim 18, wherein the second layer further including a seventh channel providing the communication between the second channel and the first outlet port of the second valve station.

23. The fluid power interlock manifold as defined in claim 17, wherein said manifold body is formed of a metallic material.

24. A method of interlocking fluid power signals comprising the steps of:

providing a first valve shiftable between a first and second state having a pressure input and first and second selectively operable outputs, said first output being operatively connectable to a first actuator;

providing a second valve shiftable between a first and second state and having a pressure input and first and second selectively operable outputs, said first output of said second valve being operatively connectable to a second actuator;

operatively connecting said second output of said first valve to said pressure input of said second valve;

operatively connecting said second output of said second valve to a first pilot signal port of said first and second valves for permitting said first valve to shift from the first state to the second state, wherein shifting from said first state to said second state of either of said first and second valves interrupts a flow of pressure from said second output of said second valve thereby preventing the non-shifted valve from being actuated and supplying pressure to a corresponding actuator.

25. The method as defined in claim 24, wherein said first and second valves include 5/2 way double solenoid activated valves having a first pilot port and a second pilot port and further comprising the step of connecting said first pilot ports of said first and second valves to a constant pressure supply.

26. The method as defined in claim 25 further comprising the step of operatively connecting said second pilot ports of said first and second valves to said second output of said second valve.

27. The method as defined in claim 26, further comprising the steps of providing a manifold and securing said first and second valves to said manifold.

* * * * *